United States Patent [19]
Stacy

[11] Patent Number: 5,844,634
[45] Date of Patent: Dec. 1, 1998

[54] FINGER-CONTROLLABLE REMOTE CONTROL UNIT

[75] Inventor: Carl W. Stacy, Elmwood Park, Ill.

[73] Assignee: Zenith Electronics Corporation, Glenview, Ill.

[21] Appl. No.: 842,171

[22] Filed: Apr. 23, 1997

[51] Int. Cl.[6] .................................................. H04N 5/45

[52] U.S. Cl. ........................................... 348/734; 341/176

[58] Field of Search ........................... 348/734; 341/176; 369/142; 345/156–167, 327, 145; D14/218

[56] References Cited

U.S. PATENT DOCUMENTS

| | | | |
|---|---|---|---|
| 3,372,789 | 3/1968 | Thiele et al. | 341/31 |
| 5,055,840 | 10/1991 | Bartlett | 341/31 |
| 5,477,223 | 12/1995 | Destrempts | 341/31 |
| 5,606,374 | 2/1997 | Bertram | 348/734 X |

*Primary Examiner*—Nathan J. Flynn

[57] ABSTRACT

A remote control device for a television receiver or the like includes a housing that defines a cavity. IR emitter-detector pairs are arranged about the cavity to establish an x-y pattern of IR beams within the cavity. Interruption of the IR beams by an opaque object, such as a human finger, activates signal generating means for generating control signals.

5 Claims, 2 Drawing Sheets

FINGER-CONTROLLABLE REMOTE CONTROL UNIT

BACKGROUND OF THE INVENTION AND PRIOR ART

This invention relates generally to trackball type remote control devices for television receivers and the like and specifically to a trackball-like remote control device that is finger operated as opposed to ball operated.

Allowed application Ser. No. 08/474,573, filed Jun. 6, 1995, now U.S. Pat. No. 5,638,061, issued Jun. 10, 1997, describes a trackball remote control transmitter for controlling a television receiver that supports the trackball unit on a cantilevered portion of a printed circuit board that is deflectable by pressure on the ball for operating a switch. The trackball device operates satisfactorily, but includes a number of moving parts, such as the ball mechanism and the coding wheels that interrupt the infrared (IR) beams generated by the IR emitters to signal the amount and the direction of rotation of the trackball. The present invention eliminates the trackball and all moving parts.

OBJECTS OF THE INVENTION

A principal object of the invention is to provide a novel remote control device.

Another object of the invention is to provide a trackball-like remote control device that is finger operated.

A further object of the invention is to provide a simple, low cost remote control device.

BRIEF DESCRIPTION OF THE DRAWINGS

These and other objects and advantages of the invention will be apparent upon reading the following description thereof in conjunction with the drawings, in which.

DESCRIPTION OF THE PREFERRED EMBODIMENT

Figure 1:
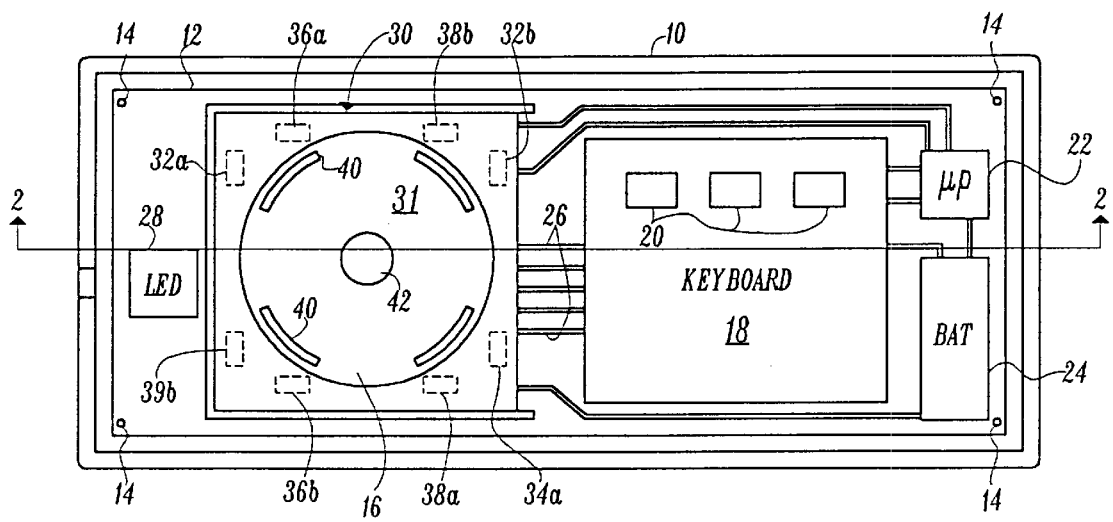
FIG. 1 is a top view of a remote control device constructed in accordance with the invention with the top portion of the case removed.
Figure 2:
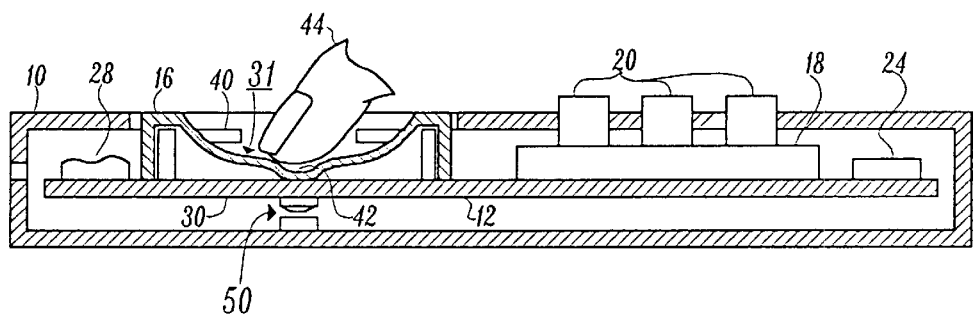
FIG. 2 is a cross section taken along the line 2—2 of FIG. 1, with a portion of a human finger shown.

Referring to FIGS. 1 and 2, an IR remote control transmitter 10 in which a printed circuit board 12 is secured by means of a plurality of screw fasteners 14, is shown. Printed circuit board 12 has a generally square-shaped cantilevered portion 30 formed therein, upon which is secured a housing 16 that defines a smooth concave dome or cavity 31. Within housing 16 are pairs of IR emitter-detectors arranged to produce spaced apart IR beams along "x" and "y" axes (see FIG. 3). The y axes emitter-detector pairs comprise elements 32a, 32b and 34a, 34b and the x axes emitter-detector pairs comprise elements 36a, 36b and 38a, 38b.

A plurality of IR energy permeable windows 40 are located around the interior of cavity 31 and enable the establishment of the two displaced x axes IR beams and the two displaced y axes IR beams within the cavity. This arrangement will be explained in detail with reference to FIG. 3. A keyboard 18, including a plurality of keys or push buttons 20, is mounted on printed circuit board 12 and coupled to the emitter-detector combinations and various other circuitry in the remote control transmitter by means of a plurality of conductive elements 26. A microprocessor 22 controls the scanning of the keyboard and the generation of IR control signals, or codes, in a well-known manner. A battery 24 supplies operating power to the transmitter and a light-emitting diode (LED) 28 transmits the IR control codes to a receiving device, such as a television receiver, not shown.

As best seen in FIG. 2, a depression 42 is formed in the center of cavity 30 for enabling the user to determine, by feel, when the finger or thumb 44 occupies a neutral position or zone in the cavity 31, i.e., a position in which the thumb or finger does not interrupt any of the IR beams that traverse cavity 31. Those skilled in the art will readily appreciate that a raised section, rather than the depression illustrated, may also be used to indicate when the user's finger is in the neutral zone in the cavity. It will also be seen that cantilevered portion 30 of printed circuit board 12 closes a switch 50 when it is deflected downward by suitable pressure applied to cavity 31. Operation of switch 50 may be used to activate a function that has been selected by a cursor on a video screen, for example, or it may be used to increase the speed of movement of the cursor, if desired. It will be appreciated that the invention is not directed to such ancillary features, but rather is concerned with the generation of the IR codes by use of a finger.

Figure 3:
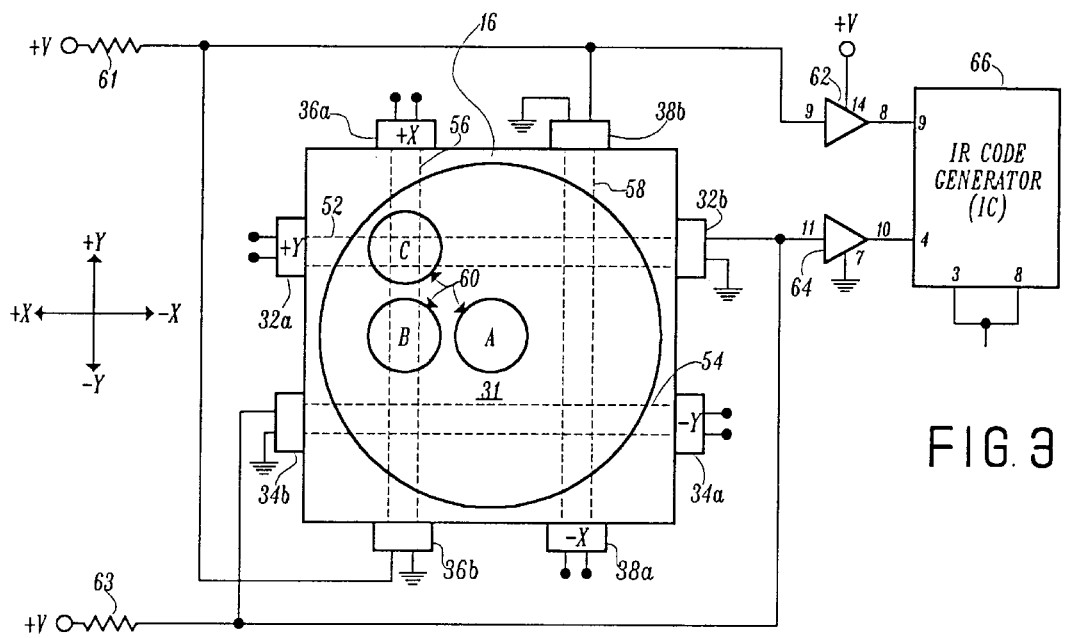
FIG. 3 illustrates the IR beam generating and detecting elements of the inventive control device.

In FIG. 3, the arrangement of the emitter-detector pairs on housing 16 for producing four IR beams that traverse the cavity 31, is more clearly illustrated. Emitter 32a is identified by the legend +y and emitter 34a is identified by the legend −y. Similarly, emitter 36a is identified by the legend +x and emitter 38a is identified by the legend −x. Each of the emitters is supplied with oscillatory driving signals, as will be described. The difference between the + and the − IR beams is that they are 180 degrees out of phase. Their corresponding detectors 32b, 34b and 36b, 38b, respectively, each have one of their two output leads connected to ground. A large pull-up resistor 61 connects +V voltage to the other output lead of each of the x detectors 36b, 38b and a pull-up resistor 63 similarly connects each of the y detectors 32b, 34b to +V voltage. The junction of the x detectors 36b, 38b supplies signals to a CMOS inverter gate 62 that supplies a vertical (x) signal to one input of an IR code generator 66. The junction of the y detectors 32b, 34b similarly supplies a horizontal (y) signal to another input of code generator 66. Code generator 66 comprises a Zylog IC (part No. Z-86L7108-R1614) that is arranged to accept phase displaced x and y axes signals from a conventional trackball and generate directional signals. The numbers on chip 66 correspond to the terminal markings on the Zylog part. The +x IR beam is labelled 56, the −x beam is 58 and the + and − y IR beams are labelled 52 and 54, respectively. The circles 60 illustrate three different positions of a human digit in cavity 31, with position A being a neutral position whereat none of the IR beams is interrupted, position B illustrating an interruption of the +x IR beam 56 and position C indicating an interruption of both the +x beam 56 and the +y beam 52.

In this connection, it should be noted that rather than operate on the basis of interrupting an IR beam, the invention may be modified to operate in an opposite manner. For example, if the + and − x and y IR beams are spaced close together, such that in the neutral position all four of the IR beams are interrupted by a finger, operation may occur by moving the finger to complete one or two of the beams. Such an arrangement is believed to be an obvious modification of the invention and is not separately illustrated.

Figure 4:
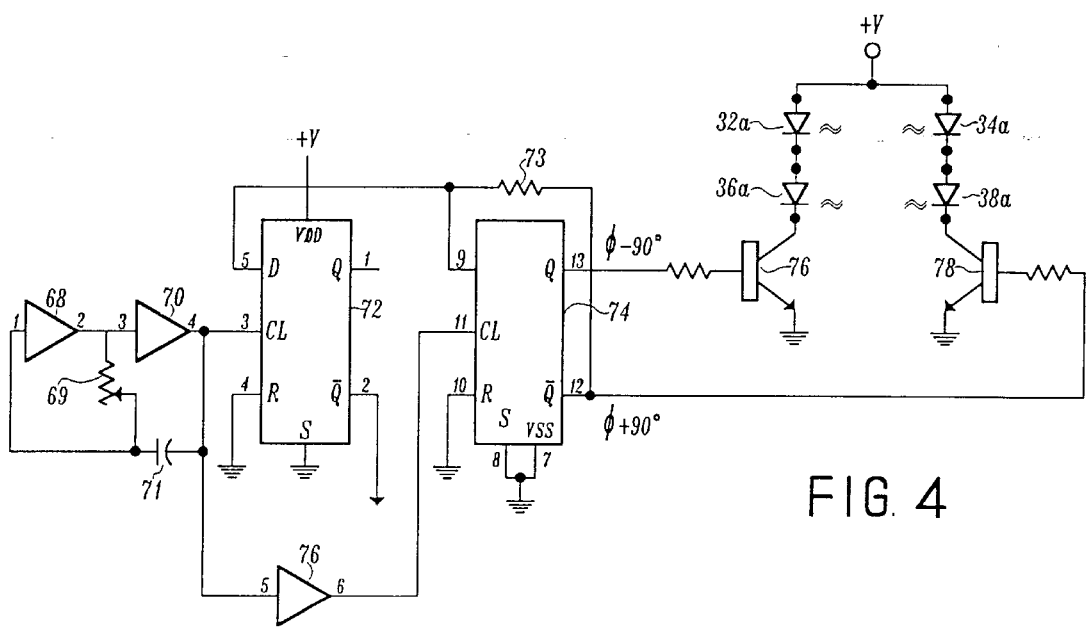
FIG. 4 is a schematic diagram of the IR beam generating circuitry.

FIG. 4 shows the arrangement for generating two phase-displaced oscillatory signals for driving the emitters of the circuit of FIG. 3. An inverter gate 68 and an inverter gate 70 are connected in series to the clock input of a flip/flop 72. A variable resistor 69 is connected across gate 68 and to a capacitor 71 that is also connected to the clock input of flip/flop 72. Resistor 69 and capacitor 71 cooperate with the gates 68 and 70 to form a free-running astable RC oscillator, the speed or frequency of which may be adjusted by changing variable resistor 69. Another inverter gate 76 applies a phase inverted signal from the RC oscillator to the clock input of a flip/flop 74. The flip/flops are supplied with +V voltage and the phase displaced output signals are coupled from the two outputs of flip/flop 74 to a pair of transistors 76 and 78. The load circuit for transistor 76 comprises the two positive x,y axes emitters 32a and 36a connected in series and the load circuit for transistor 78 comprises the two series connected negative x,y axes emitters 34a and 38a.

The input signals to inverter gates 62 and 64 (FIG. 3) are therefore seen to each consist of oppositely-phased detected IR signals which cancel when the IR beams are not interrupted. Interruption of an IR beam, for example beam 56, results in the signal applied to gate 62 being only that supplied from detector 38b, corresponding to uninterrupted IR beam 58. The gates 62 and 64 are provided to increase the power of the signals supplied to IC 66. Similarly, interruption of one or more of the other IR beams results in appropriate signals being supplied to the gates 62 and 64. It will be appreciated that the gates are high impedances and that the pull-up resistors 61 and 63 enable the system to differentiate between no interruption of either beam and interruption of both beams. The inverter gates are included in a configurable integrated circuit identified as part No. CD4069, by the RCA Corporation. The flip/flops are conventional D types which are readily available.

Figure 5:
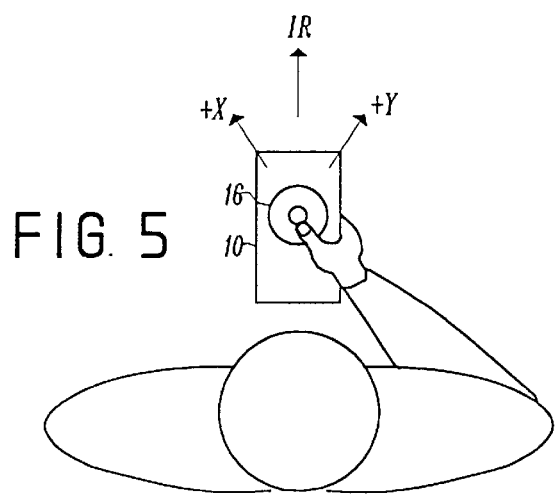
FIG. 5 shows an alternative arrangement of the x-y IR beam axes on the remote control device that conforms to the natural orientation of movements of a human thumb.

In FIG. 5, an alternative arrangement of the x and y axes on the remote control device is illustrated. Normally, the y axis will correspond to vertical movement of a cursor on the video screen and the x axis will correspond to horizontal movement. Since, in most instances, the thumb will be used in the cavity to control the cursor movement, the arrangement of FIG. 5 tends to favor the natural movement directions of the thumb (when the remote control device is being held). The arrangement is of course optional.

What has been described is a novel trackball-like remote control unit that is operated by moving a finger within a cavity on the control device through which pass a plurality of IR beams along displaced x and y axes. The integrity of the beams is sensed and directional control signals derived by changes therein. It is recognized that numerous changes to the described embodiment of the invention will be apparent to those skilled in the art without departing from its true spirit and scope. The invention is to be limited only as defined in the claims.

What is claimed is:

1. A controller comprising:

a housing defining a cavity with walls having IR transparent portions;

means for producing a plurality of IR beams arranged in an x-y axes pattern in said cavity;

means for supporting said IR beam producing means and said detecting means, respectively, behind opposed ones of said IR, transparent portions;

means for detecting an interruption of any of said IR beams in said cavity;

signal means for generating a signal;

means for operating said signal means responsive to said detecting means; and wherein said cavity is sized and contoured for accommodating a human thumb, with said x-y axis pattern being rotated in said cavity relative to the normal axial orientation of a person holding said housing in his hand.

2. A controller comprising:

a housing defining a cavity that is sized to accommodate a range of movement of a human finger;

means for producing a plurality of IR beams arranged in an x-y axes pattern in said cavity;

means for detecting an interruption of any of said IR beams by said finger in said cavity;

signal means for generating a signal; and means for operating said signal means responsive to said detecting means;

said cavity having a neutral zone wherein said human finger does not interrupt any of said IR beams; and wherein said neutral zone is characterized by a change in tactile sense to said human finger from the remainder of said cavity.

3. A remote control unit comprising:

a housing defining a cavity;

means for generating four substantially coplanar IR beams to form an x-y pattern of IR beams traversing said cavity;

said x-y pattern of four IR beams defining a centrally located neutral zone within which a human thumb may be positioned without interrupting any of said four IR beams;

means for detecting interruptions of said x-y pattern of IR beams; and signal means, responsive to said detecting means, for generating signals in response to interruptions of said IR beams.

4. The control unit of claim 3, further comprising:

tactile means located in the bottom of said cavity for identifying the location of said neutral zone.

5. The control unit of claim 3, wherein said x-y pattern of IR beams is rotated in said cavity relative to the normal axial orientation of a person holding said housing in his hand.

* * * * *